No. 774,674. PATENTED NOV. 8, 1904.
J. KELLINGTON.
FISH CLEANING MACHINE.
APPLICATION FILED MAR. 28, 1903.
NO MODEL. 4 SHEETS—SHEET 1.
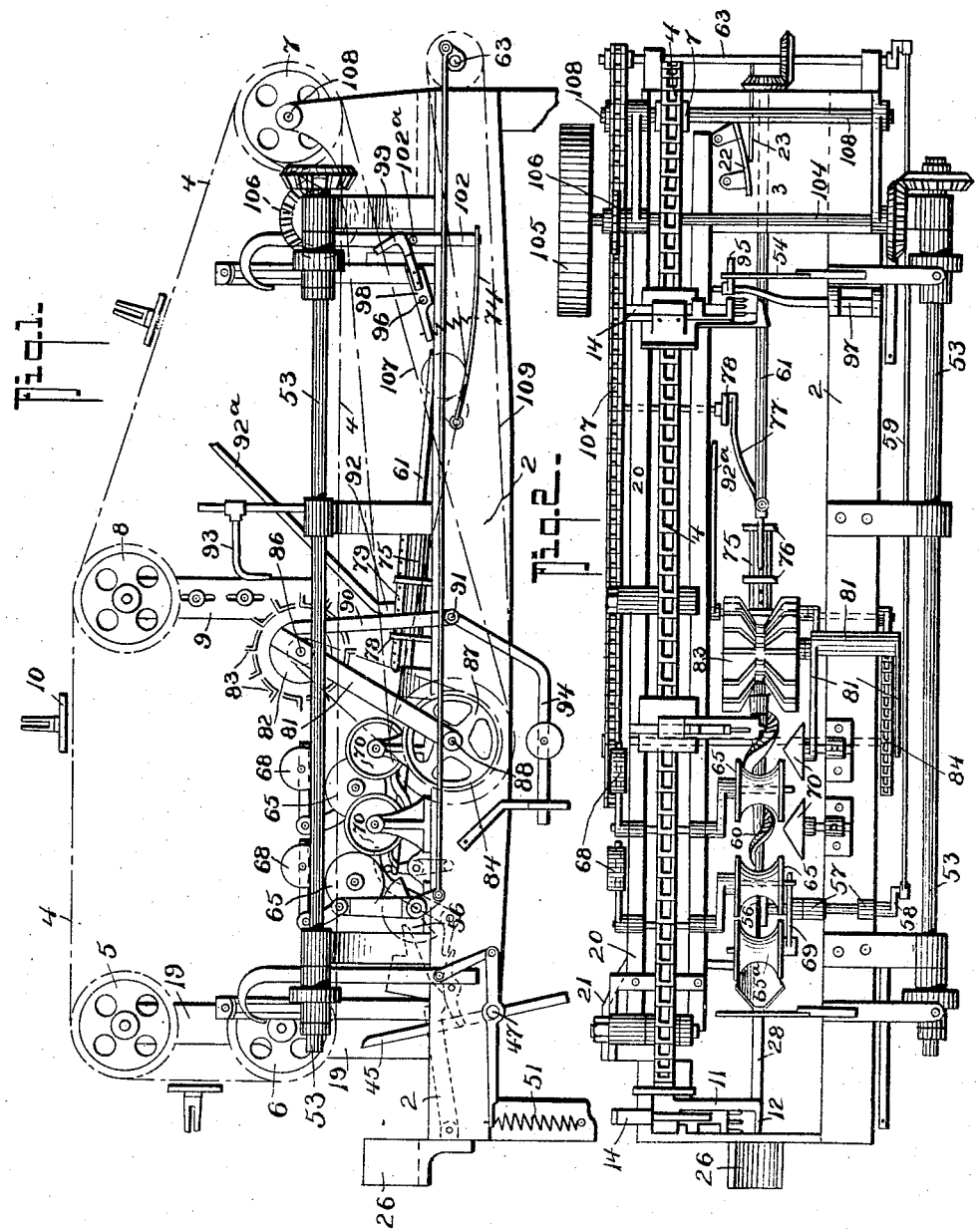
WITNESSES:
John T. Schrott
Louis Dieterich
INVENTOR
John Kellington
BY
Fred G. Dieterich
Attorney No. 774,674. PATENTED NOV. 8, 1904.
J. KELLINGTON.
FISH CLEANING MACHINE.
APPLICATION FILED MAR. 28, 1903.
NO MODEL. 4 SHEETS—SHEET 2.
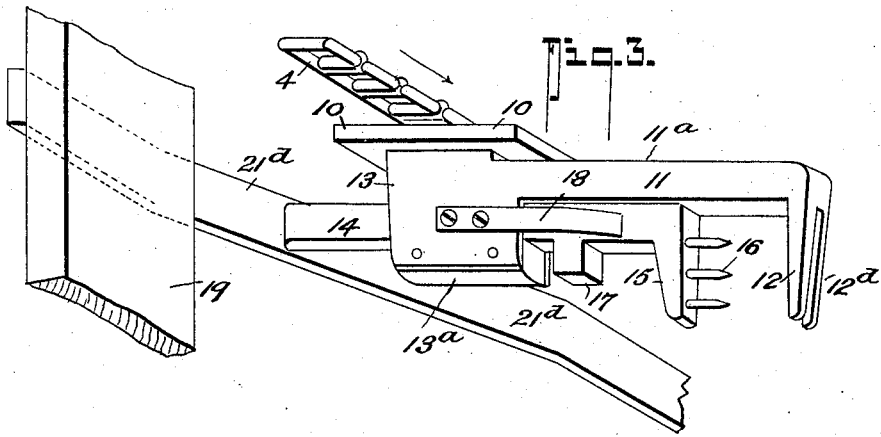
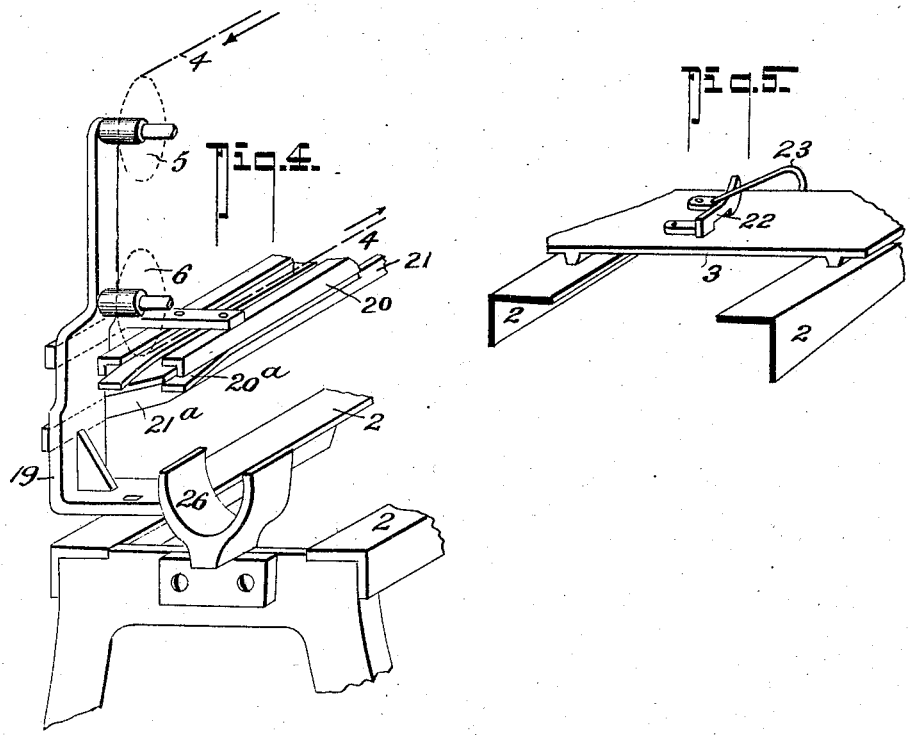
WITNESSES:
John J. Schrott
Louis Dieterich
INVENTOR
John Kellington
By Fred G. Dieterich
Attorney

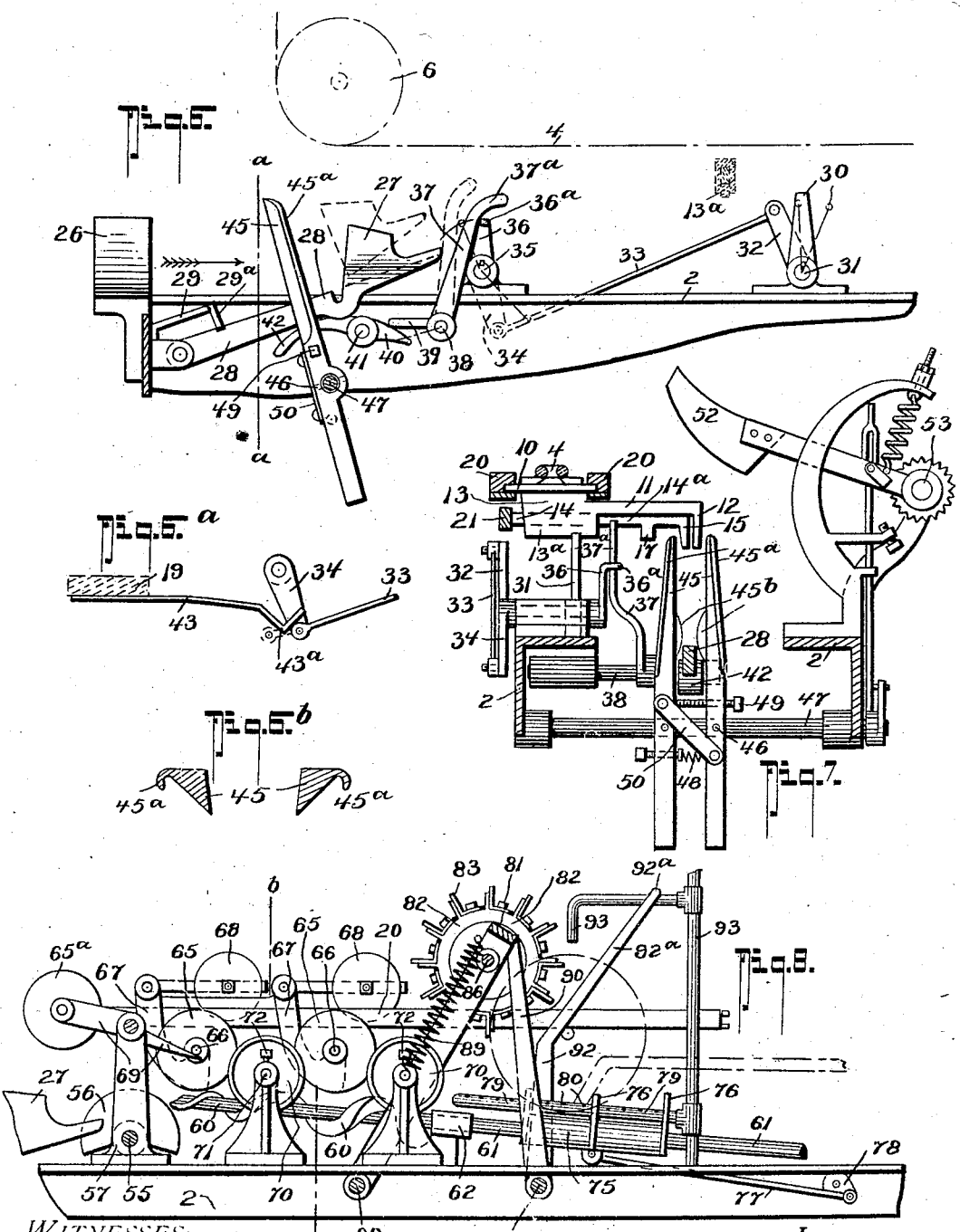

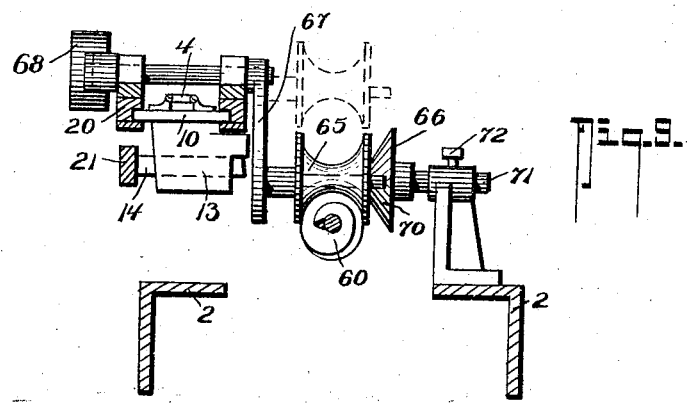

No. 774,674. Patented November 8, 1904.

UNITED STATES PATENT OFFICE.

JOHN KELLINGTON, OF NEW WESTMINSTER, CANADA, ASSIGNOR OF ONE-HALF TO D. J. MUNN AND A. EWEN, OF NEW WESTMINSTER, CANADA.

FISH-CLEANING MACHINE.

SPECIFICATION forming part of Letters Patent No. 774,674, dated November 8, 1904.

Application filed March 28, 1903. Serial No. 150,060. (No model.)

*To all whom it may concern:*

Be it known that I, JOHN KELLINGTON, a citizen of the Dominion of Canada, residing at New Westminster, in the Province of British Columbia, Canada, have invented a new and useful Improvement in Fish-Cleaning Machines, of which the following is a specification.

My invention relates to a machine for cleaning fish, and is a modification and improvement on that for which an application for a patent was filed by me on the 6th of May, 1902, under Serial No. 106,154. Several of the features revealed and claimed in that application are embodied in the present machine, while others are slightly modified.

The general idea of drawing the fish by the tail through the several operations of splitting, gutting, scrubbing, and washing without other support than that of the operative mechanism is retained in the present machine; but the reciprocating bar by which the fish was carried is replaced by an endless drag-chain provided at intervals with gripping devices, each of which as it comes around to the entering end of the machine automatically seizes a fish by the tail and draws it through. By this change I am enabled to shorten the machine considerably, while the continuous succession in which the fish pass through the cleaning operation permits an increased output to be obtained.

My improvements are further directed to provide a more positive and efficient tail-grip and a more uniform and thorough means for removing the viscera and scrubbing and washing the outside and inside of the fish.

There are also several minor points of improvement which will be specifically drawn attention to and described.

The construction and operation of the machine are fully described in the following specification and illustrated in the drawings which accompany it.

Figure 1 is a side elevation of the machine; Fig. 2, a plan of the same. Fig. 3 is a perspective view of the tail-grip and its operating-bar; Fig. 4, a perspective of the chain-guides and their connection to the end standard which carries the chain sprocket-wheels; Fig. 5, a similar view showing the tail-grip release at the other end of the machine; Fig. 6, a side elevation of the fish-receptacle and its tail elevating and depressing mechanism; Fig. 6$^A$, a detail of the spring-detent of the foregoing mechanism; Fig. 6$^B$, a detail cross-section of the gill-levers; Fig. 7, a section on the line $a\,a$ in Fig. 6, showing in end elevation the tail elevating and depressing means and the gill-levers and head-knife. Fig. 8 is a section through the side frame of the machine, showing in side elevation the splitting-knife, viscera-removing screw, and means for scrubbing and washing the outside of the fish and the visceral cavity. Fig. 9 is a cross-section on the line $b\,b$ in Fig. 8, showing the fish-supporting rollers. Fig. 10 is a perspective of the means for effecting the release of the tail-cutting-knife mechanism.

The frame of the machine consists of parallel side members 2, suitably supported at a convenient height for the operator, and forms a bed to which the various mechanisms are secured, the driving-gear being on a frame 3, fastened across the side frames at the end of the machine opposite to where the fish are entered.

The endless chain 4, by which the fish are dragged through the machine, is carried by the chain pitch-wheels 5, 6, and 7, 5 and 6 being at the entering end and 7, the driver, on the first-motion shaft 108 at the other end.

The return-chain is supported by an idler 8, the standard 9 of which, being vertically adjustable, enables it to serve also as a tightener.

The drag-chain 4 is provided at suitable intervals with tail-gripping devices secured to it, each comprising (see Fig. 3) a guide portion 10, by which the attachment to the chain is made and from which projects laterally to the middle line of the machine an arm 11, having at its end the fixed jaw member 12. Slidable within a guide 13, forming the base of the fixed arm, is a bolt 14, having a jaw member 15 to correspond with 12, and this jaw member is provided with pointed pins 16, which enter, when the jaws are closed, corresponding apertures or a slot 12ª in the fixed jaw member.

To support the grip devices under the lateral strain imposed by the drag of the fish, the guide portions 10 slide in the grooved guides 20, which extend between the extremes of the working movement of the chain, the lower bar of the guides being downwardly flared, as 20ª, at the front end to facilitate the entrance of 10. (See Fig. 4.) The slidable bolt 14 is produced at the opposite end to the jaw through the guide 13 and bears against a bar 21, secured to the sprocket-wheel standards 19 or otherwise suitably supported. At the entering end of the machine this bar is provided with an incline 21ª, by which the bolt is forced in and the jaws 15 and 12 closed on one another, and is extended throughout the working limit of the chain, so that the tail of a fish being gripped the hold is maintained until the tail has been severed and it is desired to remove it. Having passed the end limit of the bar 21, the release of the tail-grip is effected by means of the upper edge of the curved plate 22, (see Figs. 2 and 5,) which is secured to the cross-frame 3 at the farther end of the machine and, projecting upward into the path of the tail-grip, engages a projection 17 of the bolt and draws it open. As soon as the jaws 12 15 are opened slightly the point of the hook member 23 is engaged and by the further movement of the grip forces the severed tail from off the pins 16. The grips, with the jaw members open, then pass with the chain 4 over the driving-sprocket and back to the entering end of the machine. A light spring 18, secured to the outside of the belt-guide 13 and bearing against the side of the bolt, serves to prevent the jaws from shaking together during the return movement of the chain. This spring 18 is shown on the back of the grip, but will preferably be on the front side of it.

As in the previous machine, the fish to be cleaned is placed by the operator in a receiving-holder 26 belly down and tail first, (see Fig. 6,) the tail being supported by a portion 27 at the end of a lever 28, hinged to the cross-frame of the machine adjacent to 26 in such a manner that it can be lifted up so as to bring the fluke of the tail into the path of the gripping devices which pass above it. The elevation of the tail-lever into the path of the grip and its subsequent depression is effected through a series of levers actuated by the passage of the tail-grip members on the drag-chain. The elevation is performed by the grip in advance of the one which is to carry the fish in the holder, the portion 13ª of the grip engaging and moving over an upwardly-projecting lever 30, which lever is secured to a short shaft 31, mounted in bearings on the top of the side frame 2 of the machine, which shaft 31 has secured to its opposite end a short lever 32, which is connected by a rod 33 to a downwardly-projecting lever 34, fastened to a short shaft 35, mounted in bearings on the side frame 2, adjacent to the tail end 27 of the fish-holder, and on the opposite end of this shaft 35 is a short upwardly-projecting lever 36, having a laterally-projecting pin 36ª, designed to engage the front side of a bent lever 37, mounted free on a short shaft or pin 38, secured to the under side of the side frame and having a short backward projection 39 approximately at right angles to it. This projection 39 bears on the upper side of a lever 40, mounted free on a pin or short shaft 41, secured to the under side of the side frame and is laterally secured to a curved cam-shaped lever 42, on which the tail-lever of the fish-receptacle rests. Thus as the lever 30 is moved forward by the advance of the grip (see dot-and-dash lines in Fig. 6) the lever 32 is moved in the same direction, and by means of the connecting-rod 33 the downwardly-projecting lever 34 is correspondingly moved forward. The upwardly-projecting lever 36, secured to the same shaft 35, is therefore moved backward. The laterally-projecting pin 36ª of this lever bearing on the forward side of the lever 37 carries the latter backward with it, and the projection 39 is depressed on the lever 40, correspondingly elevating the cam-shaped lever 42 under the fish-holder lever 28, and the tail end is thus lifted up to the desired height to be in the path of the grip-jaws 12 15. The tail end of the cradle being elevated and the tail of the fish in it seized by the grip, the upwardly-bent end 37ª of the lever 37 is engaged by the edge 14ª of the grip-bolt and, acting through the lever system previously described, the fish-holder is lowered and the lever system restored to the operative position ready for the next elevation. A spring 43, (see Fig. 6ª,) having a V-shaped end 43ª, is secured to the standard 19, engages the eye of the rod 33 in its attachment to the lever 34, and maintains the lever system in one position or the other, as required.

The head-cutting mechanism is the same as in the previous machine, being operated by gill-levers 45, which are situated on each side of the fish-holder lever and are shaped to catch and hold the head by the gills while the body of the fish is being drawn forward, the operation being rendered more certain by the effect of an upwardly-inclined member 29, situated just in advance of the fish-holder member 26 and just over the joint-pin of the tail-elevating lever 28. This member by holding up the head of the fish by the chin while the body is crowded down on the lever 28 opens of the gills of the fish and insures them being caught by the gill-levers. At the end of 29 side portions 29ª prevent the recoil of the gill-lever spring carrying skin, &c., between the member 29 and the lever 28.

The gill-levers 45 are, as in the previous application referred to, loosely mounted on the shaft 47 by pins 46, so as to have a free pivotal movement on them, but secured against turning on the shaft. An adjustable coil-spring 48 presses the upper ends of the lever together, the distance apart being limited by an adjusting-screw 49 and the movement relative to one another centralized by the diagonal link 50.

In order to insure that the back of the gills is the determining-point for the position of the decapicating-cut, I form the cross-section of the levers (see Fig. 6$^b$) with a recurved outer edge 45$^a$, against which the edge of the gills catches and by which the levers 45 are pulled over against the resistance of the spring 51, releasing the latch and permitting the knife 52 to be operated by the rotation of the shaft 53. The mechanism which effects this release and action is identical with what is in my previous application and need not be further described.

In order to free the gill-levers from tight contact on the body of the fish until the tail-grip is secured, their inner sides (see Fig. 7) have a curved projection 45$^b$, designed to be engaged by the width of the elevating-lever 42, whereby while the fish-holder is in the elevated position the gill-levers are spread; but as soon as the fish-holder is lowered and the head approaches the gill-levers they are closed together to the required width to engage the gills, which width is adjustable to the requirements of the size and condition of the fish being cleaned by the adjusting-screw 49, before referred to.

After the removal of the head the belly of the fish is split and the viscera removed. The splitting is accomplished (see Figs. 8, 9) by a semicircular oscillating knife 56, supported in suitable bearings 57, just in advance of the end of the fish-holder, and the movement is imparted to its shaft 55 by a short arm 58 and a connecting-rod 59 from a crank on a convenient rotating shaft. Just ahead of the knife 56 is a conical quick-pitch screw 60, secured to the end of and rotatable at a high rate of speed by a shaft 61 in a bearing 62. The axis of rotation of this shaft is in the middle line of the machine, but inclined at such an angle that the upper edge of the tapered thread of the screw 60 is in a line parallel to the path of the drag-chain 4. The shaft 61 is rotated by bevel-pinions from a cross-shaft 63 at the end of the machine. This screw 60 opens the split of the belly and removes the entrails as the fish is dragged over it.

To press the body of the fish down on the splitting-knife and to maintain it in the proper position under the turning tendency of the rapidly-rotating screw, a series of back and breast rollers 66 and 70 are provided. The former are grooved to the approximate cross-section of the back of the fish and are free to rotate on spindles 66 at the lower end of the arms 67, which are pivotally mounted and partially counterbalanced by adjustable weights 68, so as to bear down on the passing fish and rise and fall as occasion may require. They are lifted to permit the passage of the tail-grip by the cam-like conformation of the carrying-arms 67, which are engaged by the edge 11$^a$ of the tail-grip member as it approaches each one.

As the guide portion 10 of the grip is not in the guide-grooves 20 when the first back roller 65$^a$ is encountered the normal position of this one is up out of action, and it is allowed to fall into operative contact by an arm 69, which extends under the spindle 66 of the second roller, so that as the second one is lifted the first one is allowed to bear down on the fish.

The breast-rollers 70 are flattened cones rotatable on spindles 71, which are adjustable in their brackets by the screw 72 and so placed that the lower conical face bears against the side of the passing fish and opposes the turning effort of the viscera-removing screw 60.

Slidable on the shaft 61 of the screw 60 and close up to the bearing 62 is a scrubber 75, having a series of ridges 76, the shape of which conforms approximately to the cross-section of the intestinal cavity. This scrubber has a rapid endwise-reciprocating movement imparted to it from a small crank 78 by the connecting-rod 77, and parallel to the screw-shaft 61 and extending close up to the butt-end of the screw is a water-service pipe 79, having a series of perforations 80 along its upper surface. The pipe passes through the ridges of the scrubber, which is slidable loosely on it as it reciprocates. The action of this scrubber is to clean the intestinal cavity, the ridges 76 scraping away the slimy skin and blood which cling around the backbone of the fish, and the water-spray from the perforations 80 washes it away.

Just above the reciprocating internal scraper is rotatably mounted on a swinging frame 81 a back-scrubber constructed of a number of pieces 83, of flexible canvas-rubber, secured to a bladed wheel 82. The pieces 83 are shaped to conform somewhat to the cross-section of a fish's back, and the wheel is rotated at a moderately high rate of speed by a light chain 84 over a pinion 85 on the scrubber-shaft 86 from a chain pitch-wheel 87, keyed on a shaft 88, which also forms the pivot about which the scrubber-frame swings. The weight of the scrubber and its frame is partially counterbalanced by a coil-spring 89, and the frame is lifted and held out of use when no fish is under it by a lever 90, secured to a shaft 91, at the other end of which is secured another lever 92, projecting in the path of the tail-grips, which as they bring a fish forward depress the lever 92 and by withdrawing the lever 90 from the support of the scrubber-frame 81 allow the scrubber to be lowered onto the passing fish. The bent extension 92ª to the lever 92 permits the scrubber to lie on the fish while the average length of fish is passing under it, and the lever system has a counterweight on a lever 94 to raise the scrubber out of action as soon as the grip is disengaged from 92ª.

A jet of water from a service-pipe 93 is directed on the center of the scrubber to facilitate the washing, and a light casing (not shown) incloses the scrubber to prevent the spray being scattered. This finishes the cleaning process, and it only remains to cut the fish from the tail in the grip. This is performed by a knife 54, operated from the shaft 53 in the same manner as the head-knife. The release mechanism is, however, brought into play in a different manner.

In advance of the scrubbers a sufficient distance to insure that the fish is clear of it a short lever 95 projects upwardly in the path of the tail-grip member 14. The lever is secured to a short shaft 96 in bearings 97 on the side frame 2, and at the outer end of this shaft 96 an arm or lever 98 is secured, having a detent member 99 pivotally mounted on a pin 100 in the end of 98, so as to be susceptible of lateral movement against the resistance of a flat spring 101, secured to the lever 98 and bearing against the detent member 99. The detent 99 engages the pin 102ª of the rod 102, which effects the release of the knife-operating mechanism, and this having been effected and the knife fallen the detent is thrown out of engagement with the pin 102ª by the incline 103 forcing the detent-piece 99 laterally and off the pin 102ª, the detent-piece moving on the hinge-pin 100 against the resistance of the spring 101. The detent-piece 99 is provided with an upwardly-turned end 99ª to prevent it getting over the pin 102ª and to the under side of it. A coil-spring 73, between a tail end 98ª of the lever 98 and a pivotally-mounted lever 74, the end of which bears against the lower end of the rod 102, maintains the system in the normal position, and a stop 64, secured on the shaft 96, determines such position. The detent is disengaged from the pin in this manner, so that the tail-cutting knife having once delivered its blow, been disengaged from the operating-gear, and recovered by its spring, the rod 102, which controls the knife-operating mechanism, may be free to return and sustain it out of action until the next tail-grip again releases it.

The general means of operating the several shafts is not material to this application, but is indicated in Figs. 1 and 2, 105 being the pulley on the first motion-shaft 104, driven by a belt from a power source exterior to the machine, and a sprocket-wheel 106 on this shaft drives a chain 107, passing over a sprocket-wheel on the shaft 88 for the external scrubber, and another on the shaft 108, on which is the chain-wheel 7, which drives the drag-chain 4. The screw-shaft 61 is driven by bevel-gears from a cross-shaft 63, which is driven by a chain 109 from the shaft 88, which chain also drives the shaft on which is the crank 78, which operates the visceral scrubber 75. The splitting-knife is operated by a crank on the end of the cross-shaft 63, and the shaft 53, which actuates the head and tail cutting knives, is driven by bevel-gears from the first motion-shaft 104.

The machine is further provided with the necessary separate hoppers and chutes for receiving the offal and the cleaned fish and conveying the same away.

Having now particularly described my invention, what I claim as new, and desire to be protected in by Letters Patent of the United States, is—

1. In an apparatus for cleaning fish, the combination with devices for splitting the fish and for removing the viscera, of means for conveying the fish to the said splitting and viscera-removing devices, which consists of an endless chain, fish-grips secured thereto, each of the said grips comprising a fixedly-held jaw and a movable jaw, and mechanisms for shifting the movable jaw toward or from the fixed jaw to grip the fish and to release the same at predetermined intervals.

2. In an apparatus for cleaning fish of the character described; the combination with a trough for supporting the fish tail foremost, and a means for splitting the fish and removing the viscera; of means for delivering the fish tail foremost in the longitudinal line of travel, which comprises an endless belt, supports for the belt disposed in a plane above the splitting and viscera-removing means whereby the said belt passes over the splitting and viscera-removing means, and grips projected at right angles from the belt, each of the said grips consisting of a pair of jaws one of which is movable with respect to the other, a means for closing the movable jaw against its mate as the grip passes over the tail of the fish mounted in the supporting-trough and for shifting said movable jaw to its open position after the fish has been split and cleaned, for the purposes set forth.

3. In a fish-cleaning machine of the character described; the combination with the splitting and viscera-removing devices, of a means for conveying the fish tail foremost into position to be engaged by the aforesaid devices, the said means consisting of an endless chain, supports therefor, and tail-gripping members mounted on the chain to project pendently therefrom as the chain passes over the splitting and viscera-removing devices, the said grip members including jaws adapted to close upon the tail of the fish, a device for coacting with the said gripping-jaws at predetermined intervals and adapted to first close the grip-jaws and then open them, for the purposes set forth.

4. In a fish-cleaning machine of the character described; the combination with a splitting and a cleaning device; of an endless drag-chain movable over the splitting and the cleaning devices, tail-grips secured at intervals to the drag-chain each of which comprises a fixed jaw member that projects laterally over the splitting and cleaning devices; said fixed jaw having a guide portion, another jaw movable lengthwise in the guide portion of the fixed jaw, means for bringing the movable jaw against the fixed jaw to grip the fish-tail, and another means for shifting the said movable jaw to release the grip on the fish-tail, as set forth.

5. In a fish-cleaning machine of the character described, the combination with a suitable supporting-frame, a drag-chain, tail-gripping devices mounted thereon, a splitting means and a cleaning means over which the chain passes; of a trough adapted to receive the fish belly down, and a device for elevating the tail of the fish into position to be gripped by the tail-gripping means, for the purposes set forth.

6. In a fish-cleaning apparatus of the character described, the combination with the splitting and cleaning devices, and a means for conveying the fish tail foremost to the said splitting and cleaning devices, of automatically-closing levers for engaging with the gills of the fish, a tail-elevating member, and a device for actuating said tail-elevating member, said device being coöperatively connected with the gill-engaging levers in such manner as to spread the said levers when the tail-elevating member is raised and to disengage the said levers to allow them to automatically close against the fish when the tail of the fish is gripped and the tail-elevating member lowers, as set forth.

7. In an apparatus for cleaning fish, the combination with the head-knife, the separating and viscera-removing devices, a means for advancing the fish horizontally, belly down and tail foremost, the lever members actuated to engage and hold the gills of the fish and to effect a release of the head-knife, said lever members including supplemental hook-shaped portions for engaging the edges of the gills of the fish, for the purposes specified.

8. In a fish-cleaning machine in combination, a conveyer adapted to drag the fish belly down through the machine, knives for removing the head and an independent splitting-knife for laying open the belly as the fish is drawn thereover by the conveyer, means for removing the viscera, consisting of a revoluble screw disposed adjacent the splitting-knife and in the line of movement of the fish through the machine, whereby to engage the fish-body after it has been opened by the splitting-knife and devices for steadying the body of the fish during the latter operation as set forth.

9. In an apparatus for cleaning fish of the character described, a supporting-frame, a head-knife and a splitting-knife, a conveyer for dragging the fish into position to be engaged by the head and splitting knives, means for removing the viscera disposed in the line of movement of the fish, and so mounted on the frame as to engage the fish after it has been split, grooved rollers revolubly mounted on the frame above the viscera-removing means to engage the back of the fish and to hold the fish against the splitting and viscera-removing means, said grooved rollers being yieldable vertically, the said viscera-removing means consisting of a revoluble screw and breast-rollers to resist the turning tendency of the revoluble screw.

10. In an apparatus for cleaning fish of the character described, in combination with the belly-splitting and viscera-removing devices, and means for conveying the fish tail foremost, belly down, into engagement with the said devices; of scrubbing and washing mechanism arranged to act on the fish after it has been engaged by the viscera-removing means, the said scrubbing and washing device comprising an endwise-slidable body having transverse scraping-ridges to engage the insides of the intestinal cavity of the fish, a perforated pipe slidable on the upper side of the scrubber, means for reciprocating the scrubber, and means for feeding water to the perforated pipe, as set forth.

11. In a fish-cleaning apparatus of the character described, a fish-conveyer means for operating the conveyer, viscera-removing means, a scrubbing means adjacent the discharge end of the viscera-removing means adapted to engage with and clean the intestinal cavity of the fish, a second scrubber mounted over the first-named scrubber said second scrubber being arranged to scrub the back of the fish and consisting of a rotatable member composed of yielding cross-ridges approximately shaped to the cross-section of the back of the fish, a water-supply for both scrubbers, a means for holding the back-scrubber out of action, a device for tripping the said scrubber-holding means while a fish is under the back-scrubber, and means for rotating the said back-scrubber under a high rate of speed.

12. In an apparatus for cleaning fish; an endless-chain conveyer which advances the fish and which is provided with tail-grips, means for successively removing the head and splitting the fish and the viscera-removing means; in combination with the tail-severing knife arranged to sever the tail after the fish-body has been moved away over the viscera-removing means, a mechanism for actuating the said tail-knife which consists of a rock-shaft, a lever thereon adapted to be engaged by the tail-grips, a second lever and spring-controlled detent mounted thereon for engaging the tail-knife, and means for actuating the said levers and the trip device for releasing the aforesaid detent, as set forth.

13. In an apparatus for cleaning fish, the combination with the splitting and viscera-removing mechanism, arranged substantially as shown; of a mechanism for advancing the fish horizontally belly downward into engagement with the said splitting and the viscera-removing mechanism, the said means comprising an endless carrier-chain, gripping-jaws connected thereto and adapted to grip the fish by the tail and drag the same forward, and a device for engaging with the said grips for opening the same to release the portion gripped thereby after the fish-body has been cleaned and severed from the tail, as set forth.

14. In an apparatus for cleaning fish, mechanism for advancing the fish, cutting devices successively operating to remove the head, split the fish and remove the intestines, a scrubber endwise movable and having scraping-ribs for engaging the walls of the intestinal cavity of the fish, means for reciprocating said scrubber as the cleaned fish is drawn thereon, and a water-spray coöperatively joined with the said scrubber, for the purposes specified.

15. In an apparatus for cleaning fish, the combination with means by which the fish is advanced, cutting devices for successively removing the head and for splitting the fish, and means for removing the viscera, of a back-scrubber mechanism consisting of a pivotally-mounted frame, a scrubber-wheel rotatably supported in the outer end of the said frame, said wheel having radial blades and flexible pieces connected to said radial blades and shaped to conform to the cross-section of the fish's back, means for rotating said wheel, and a coil-spring forming a counterbalance for the pivoted frame that carries the scrubber-wheel, for the purposes specified.

16. In an apparatus for cleaning fish of the character described; in combination with the means by which the fish is advanced, cutter devices for first removing the head and then splitting the fish, and a viscera-removing means; of a scrubber reciprocated within the intestinal cavity of the fish, a second scrubber device which is mounted over the first scrubber for engaging the back of the fish, the said scrubber consisting of a wheel rotatable in the free end thereof and having radial blades provided with flexible pieces that are shaped to the cross-section of the fish-back, means for imparting rotary motion to the back-scrubber, and another means for imparting reciprocable motion to the other scrubber, as set forth.

In testimony whereof I have signed my name to this specification in the presence of two subscribing witnesses.

JOHN KELLINGTON.

In presence of—
GUS HENSHOR,
DELLA DAVIDSON.